(12) United States Patent
Hsu

(10) Patent No.: US 6,717,984 B1
(45) Date of Patent: Apr. 6, 2004

(54) METHOD FOR ANALYZING A SAMPLE WAVEFORM IN THE TIME DOMAIN

(75) Inventor: Wen-Lung Hsu, Taipei (TW)

(73) Assignee: Via Technologies, Inc., Taipei (TW)

( * ) Notice: Subject to any disclaimer, the term of this patent is extended or adjusted under 35 U.S.C. 154(b) by 665 days.

(21) Appl. No.: 09/587,903

(22) Filed: Jun. 6, 2000

(30) Foreign Application Priority Data

Nov. 11, 1999 (TW) ........................................ 88119802 A

(51) Int. Cl.⁷ .......................... H04B 17/00; H04B 3/46; H04Q 1/20
(52) U.S. Cl. ...................... 375/224; 324/76.12; 702/66
(58) Field of Search ................................. 375/224, 226, 375/371, 377; 324/76.11, 76.12, 76.15, 76.19, 76.2; 702/57, 66

(56) References Cited

U.S. PATENT DOCUMENTS 3,732,405 A * 5/1973 Stewart ........................ 702/75
5,877,620 A * 3/1999 Tomi ........................ 324/76.12

* cited by examiner

Primary Examiner—Jean B. Corrielus
(74) Attorney, Agent, or Firm—Rabin & Berdo, P.C.

(57) ABSTRACT

A method of analyzing a sample waveform in the time domain. Firstly, a periodic wave, such as a sinusoidal wave, is inputted into a waveform processing module for obtaining a sample waveform. Next, a detection of a number of peaks of the sample waveform is performed. A determination is then made as to whether the period of the sample waveform is obtainable from the peaks of the sample waveform. If not obtainable, it indicates the waveform processing module is malfunctioning. If obtainable, a determination is then made as to whether the period of the sample waveform is equal to the predicted period. According to this determination, it indicates whether the waveform processing module is functioning.

17 Claims, 3 Drawing Sheets

METHOD FOR ANALYZING A SAMPLE WAVEFORM IN THE TIME DOMAIN

BACKGROUND OF THE INVENTION

This application incorporates by reference Taiwanese application serial No. 88119802, filed Oct. 11th, 1999.

1. Field of the Invention

The invention relates in general to the method for analyzing a sample waveform in the time domain, and more particularly to the method for analyzing a sample waveform and comparing of the sample waveform and its original input in the time domain in an efficient way.

2. Description of the Related Art

Computer systems nowadays are capable of processing audio and video data. For dealing with audio and video, computer systems are equipped with hardware and software for processing audio and video data. For instance, a coder/decoder (CODEC) is utilized in the circuitry for processing signals from audio channels, such as the LINE-IN or CD-IN channels, of an audio add-in card or a main board with built-in audio chips of a computer system. For the software instances, audio recording/playing applications and video recording/playing applications are the applications bundled with the computer peripherals or computer systems. Thus, for the testing of these hardware and software products, a method of analyzing the sample waveform is required by comparing the sample waveform with the original waveform for the purpose of determining whether the functionality of the circuitry or the application is working properly. In addition, if the software application works properly, the testing is further able to test whether the hardware product is working properly.

Generally, the fast Fourier transform (FFT), which converts the sample waveform from a time domain to a frequency domain, is the conventional method used. Further analysis is then performed in the frequency domain. However, it has the drawbacks that it requires many complicated and time-consuming calculations.

SUMMARY OF THE INVENTION

It is therefore the object of the invention to provide a method of analyzing a sample waveform in the time domain. According to the invention, the analyzing and comparing of the sample waveform and its original are quickly completed in the time domain without using the FFT. In addition, by using the method in the testing of a waveform processing module, such as a circuitry for processing signals from audio and/or video channel, the test result is obtained easily and quickly.

In accordance with the object of the invention, it provides a method of analyzing a sample waveform in the time domain which includes the following steps. Firstly, a periodic wave is inputted into a waveform processing module for obtaining the sample waveform. Next, a determination is made as to whether the sample waveform is recognizable. If not recognizable, the amplitude of the periodic wave is increased and the previous steps are repeated until the sample waveform is recognizable. If recognizable, the period of the sample waveform is determined. For the determination of the period, a number of peaks of the sample waveform are detected. After that, a determination is made as to whether the period of the sample waveform is obtainable from all of the peaks obtained above. If not obtainable, the method discontinues and it indicates the waveform processing module is malfunctioning. If obtainable, the period is determined and a determination is then made as to whether the period of the sample waveform is equal to a predicted period of the sample waveform. If equal, it indicates the waveform processing module is functioning. If not equal, it indicates the waveform processing module is malfunctioning.

BRIEF DESCRIPTION OF THE DRAWINGS

Other objects, features, and advantages of the invention will become apparent from the following detailed description of the preferred but non-limiting embodiment. The description is made with reference to the accompanying drawings in which.

DESCRIPTION OF THE PREFERRED EMBODIMENT

Figure 1:
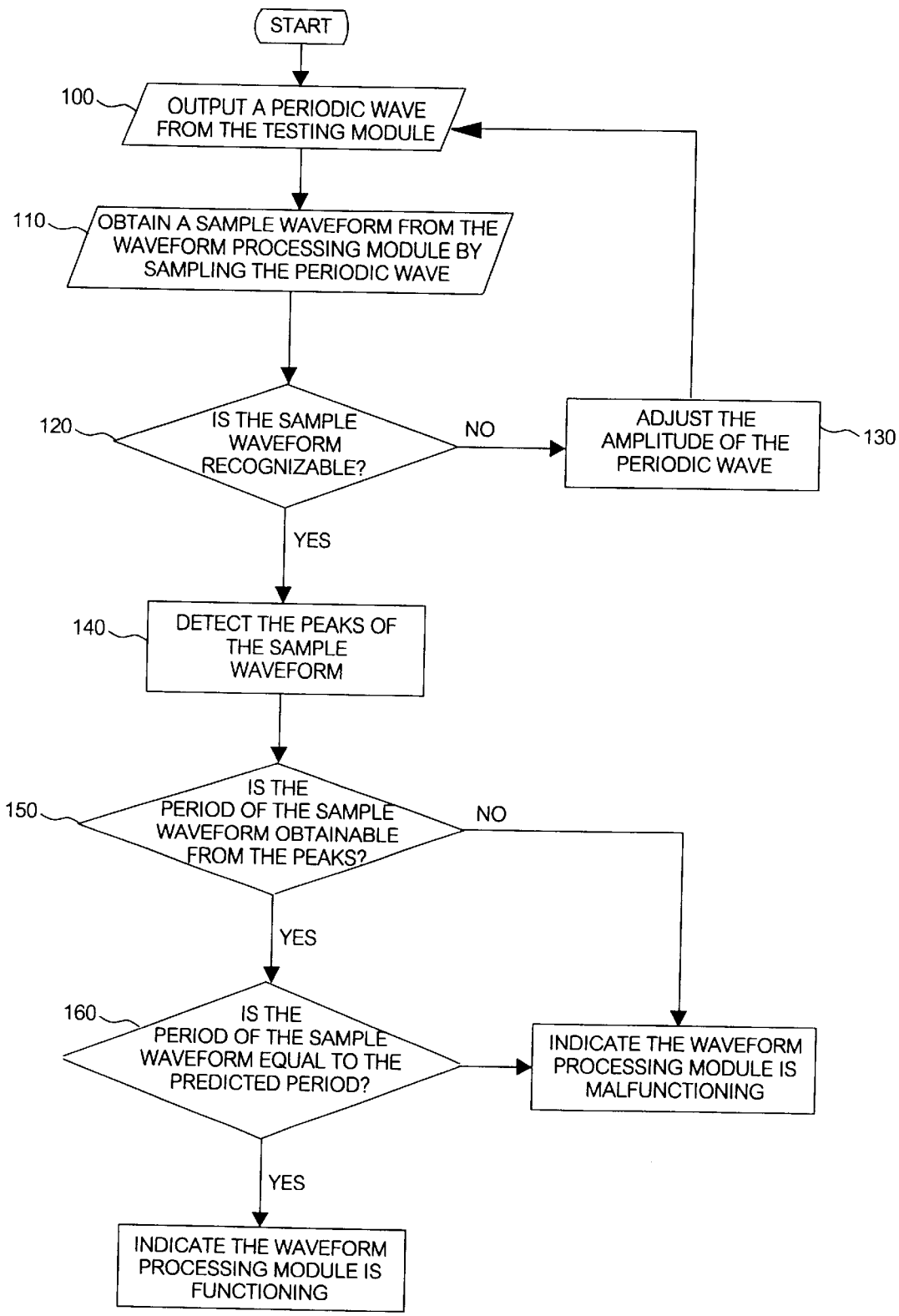
FIG. 1 is the flowchart of the method of analyzing a sample waveform in the time domain according to a preferred embodiment of the invention.

Referring first to FIG. 1, the method of analyzing a sample waveform according to the preferred embodiment of the invention is shown in a flowchart. The waveform processing module represents either a circuitry or a software module that processes waveforms such as audio and video waveforms. An example of a circuit module is a CODEC-based circuit for processing signals from LINE-IN or CD-IN channels while an example of a software module is an audio recording application.

Figure 2:
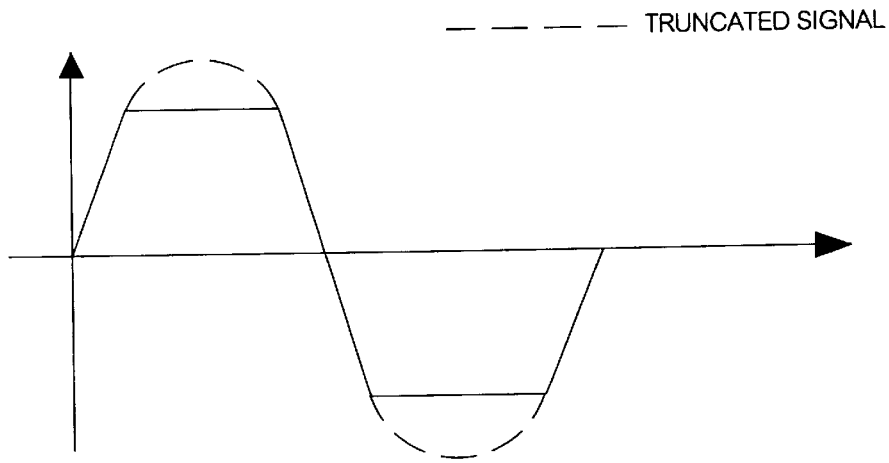
FIG. 2 illustrates the sample waveform with truncation.

Firstly, a testing module generates a periodic wave, such as a sinusoidal wave, at step 100. The testing module can be a software program, a circuit, or a system composed of software and hardware. An example of the testing module is a circuitry based on a digital-to-analog converter and a data generator that generates sampling data of a waveform at a specific sampling rate and period. Since a sinusoidal wave is the fundamental wave of all waveforms, the sinusoidal wave is analyzed more readily. Thus, it is used in this preferred embodiment. The data generator typically generates sampling data of a sinusoidal wave, which the digital-to-analog converter receives and converts into a sinusoidal wave. Next, the waveform processing module receives and processes the sinusoidal wave, resulting in a sample waveform at step 110. A determination is then made as to whether the sample waveform is recognizable within a predetermined range of recognizable amplitudes at step 120. In other words, it is determined whether the amplitudes of the sample waveform are smaller than the upper bound of the predetermined range and larger than the lower bound of the predetermined range. If, at step 120, it is determined that the amplitude of the sample waveform is outside the predetermined range, the method proceeds to step 130. At step 130, the amplitude of the periodic wave output by the testing module is adjusted. Specifically, if the amplitude of the sample waveform is greater than the upper bound of the predetermined range, such as the sample waveform is truncated as shown in FIG. 2, the testing module outputs a sinusoidal wave of smaller amplitude. If the amplitude of the sample waveform is smaller than the lower bound of the predetermined range, the sample waveform cannot be recognized and the testing module outputs a sinusoidal wave of greater amplitude. The adjustment of the amplitude of the sinusoidal wave continues until the sample waveform is recognizable.

Figure 3:
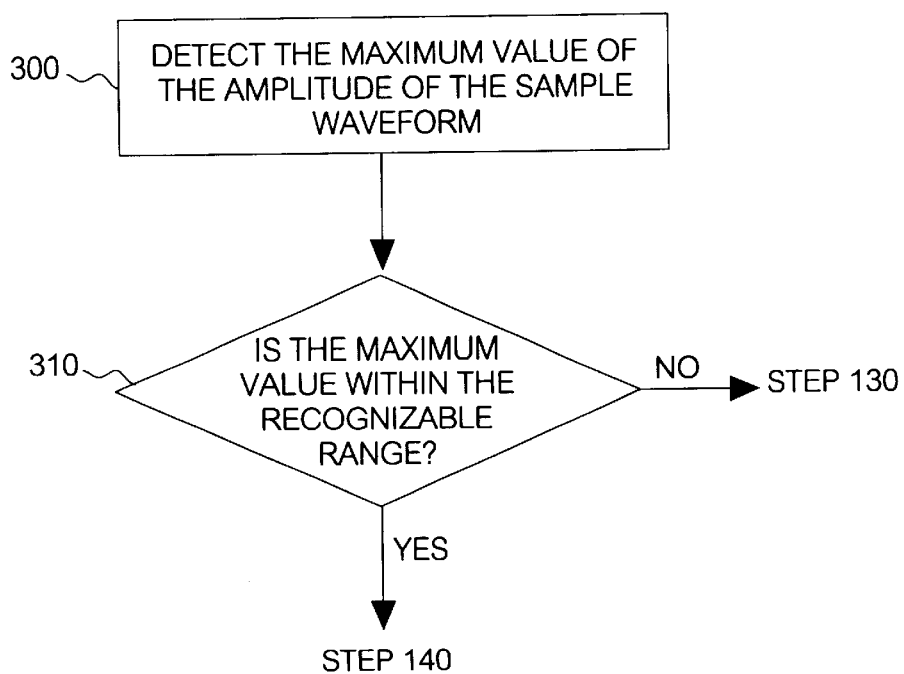
FIG. 3 is the flowchart of the steps corresponding to step 120 of FIG. 1.

Referring to FIG. 3, it shows the steps corresponding to step 120 of FIG. 1. Firstly, the sample waveform is scanned and the maximum value of the amplitude is detected at step 300. At step 310, a determination is made as to whether the maximum value detected at step 300 is within the predetermined range. If so, the method proceeds to step 140, otherwise the method proceeds to step 130.

Referring back to FIG. 1, if, at step 120, the sample waveform is determined to be recognizable, the method proceeds to step 140. At step 140, the peaks of the sample waveform are detected and then the method proceeds to step 150. A determination is made at step 150 as to whether the period of the sample waveform is obtainable from the peaks detected at step 140. If not (e.g. the peaks do indicate no periodicity of the sample waveform), then it indicates the waveform processing module has a problem and the method discontinues.

Figure 4:
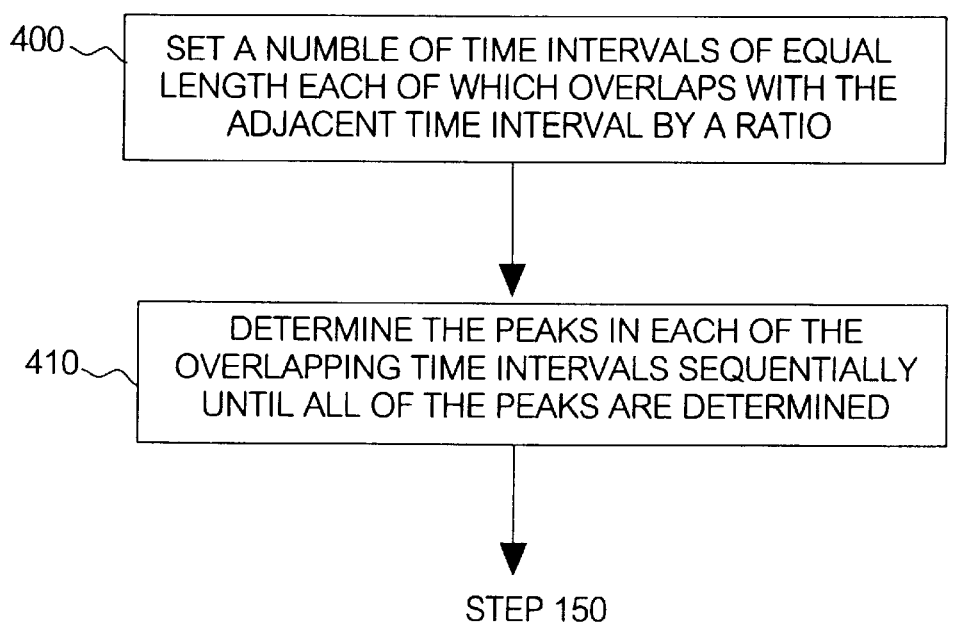
FIG. 4, is the flowchart of the steps corresponding to step 140 of FIG. 1.

Referring to FIG. 4, it shows the steps corresponding to step 140 of FIG. 1. At step 400, a number of time intervals of equal length are defined as time intervals of length equal to half of the predicted period of the sample waveform. In addition, each time interval overlaps with the next time interval by a ratio. For example, suppose the overlapping ratio is 1/2, then the next time interval begins in the middle of the preceding time interval. Thus, by using the overlapping time intervals, the peaks of the sample waveform are determined without losing any of the peaks. After step 400, the method proceeds to step 410. At step 410, the peaks of the sample waveform are sequentially determined in the overlapping time intervals. The values of the amplitude of the sample waveform that are determined as peaks in step 410 must satisfy two conditions. The first condition is that the value of amplitude in the sample waveform is over a threshold value, and the second one is that this value is the maximum in the time interval where the value is detected. As for the selection of the threshold value, it is taken as the maximum value of amplitude of the sample waveform multiplied by a ratio of less than one (e.g. 0.8). After determining the peaks of the sample waveform by the conditions in the time intervals, the method proceeds to step 150.

If, at step 150, the peaks do not indicate any periodicity of the sample waveform, then it indicates the waveform processing module has a problem and the method discontinues.

If, at step 150, it is determined that the period of the sample waveform is calculable from the peaks obtained at step 140 (i.e. the sample waveform is periodic), then the period of the sample waveform, symbolically $T_p$, is equal to the time elapsed between two adjacent peaks and the method proceeds to step 160. At step 160, a decision is made as to whether the period of the sample waveform is equal to the predicted period that is determined from the sampling rates. The sinusoidal wave output by the testing module, as described above, is originally obtained from a sampling data of a waveform with period $T_o$ at sampling rate $R_o$ and the sinusoidal wave is sampled by the waveform processing module at sampling rate $R_p$. In general, the sampling rates that are used in pulse code modulation (PCM) include 8 kHz, 11.5 kHz, 22.05 kHz, 44.1 kHz, and 48 kHz. Given the above, the predicted period $T_{predicted}$ is defined by:

$$T_{predicted} = (R_p/R_o)T_o.$$

If, at step 160, it is determined that $T_p$ is equal to $T_{predicted}$, the waveform processing module is operating properly (i.e. the circuit or program that performing recording is working normally). If not, the waveform processing module is operating improperly (i.e. the circuit or program that performs recording is working abnormally). After step 160, the method for the rapid analysis of sample waveforms in the time domain is completed and test result of the waveform processing module is obtained.

The preferred embodiment of the method for the analysis of a sample waveform in the time domain is disclosed as above. According to the invention, the analysis of a sample waveform is completed quickly and simply in the time domain rather than converting to the frequency domain using complicated FFT followed by analysis in the frequency domain. Thus, the invention is applicable to the testing of waveform processing modules such as hardware or software modules processing audio and/or video data. By using this method in the testing of the waveform processing module, a diagnosis is quickly obtained. Thus, it leads to better efficiency in analyzing waveforms, shorter time to obtain the tested waveform processing module's diagnosis, and relatively lower costs in testing due to its simplicity.

While the invention has been described by way of example and in terms of the preferred embodiment, it is to be understood that the invention is not limited to the disclosed embodiment. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for analyzing a sample waveform in the time domain, comprising the steps of:
   (a) inputting a periodic wave into a waveform processing module for obtaining the sample waveform;
   (b) determining whether the sample waveform is recognizable;
   (c) if sample waveform is found not recognizable in step (b), then adjusting the amplitude of the periodic wave and repeating the steps (a) and (b);
   (d) if sample waveform is found recognizable in step (b), then determining the period of the sample waveform; and
   (e) if sample waveform is found recognizable in step (b), then determining whether the period of the sample waveform is equal to a predicted period of the sample waveform.

2. The method according to claim 1, wherein the step (d) comprises the steps of:
   (d1) detecting a plurality of peaks of the sample waveform; and
   (d2) determining whether the period of the sample waveform is obtainable from the peaks;
   (d3) if the period of the sample waveform is found not obtainable from the peaks, stopping the method.

3. The method according to claim 2, wherein the step (c) comprises the steps of:
   (c1) determining the maximum value of amplitude of the sample waveform; and
   (c2) lowering the amplitude of the periodic wave if the maximum value of amplitude of the sample waveform is greater than an upper bound of a predetermined range of recognizable amplitudes; or increasing the amplitude of the periodic wave if the maximum value of amplitude of the sample waveform is lower than a lower bound of the predetermined range of recognizable amplitudes.

4. The method according to claim 3, wherein the step (d1) comprises the steps of:
   (d11) obtaining a threshold value by multiplying the maximum amplitude of the sample waveform by a first ratio;
   (d12) setting a plurality of time intervals, each of which is of the same length and overlaps with the adjacent time interval by a second ratio; and
   (d13) sequentially determining the maximum value of the sample waveform in each interval, wherein the maximum value must be greater than the threshold value.

5. The method according to claim 4, wherein the first ratio in the step (d11) is equal to or greater than 0.8.

6. The method according to claim 4, wherein the length of each of the time intervals in the step (d12) is about half of the predicted period.

7. The method according to claim 4, wherein the second ratio in the step (d12) is about ½.

8. The method according to claim 2, wherein the period is unobtainable from the peaks if, at the step (d2), the peaks indicate that the sample waveform is not periodic.

9. The method according to claim 2, wherein the period is the time elapsed between two adjacent peaks if, at the step (d2), the peaks indicate that the sample waveform is periodic.

10. The method according to claim 2, wherein the waveform processing module is malfunctioning when, at the step (d2), the period of the sample waveform cannot be determined from the peaks.

11. The method according to claim 1, wherein the waveform processing module is malfunctioning when, at the step (e), the period of the sample waveform is not equal to the predicted period.

12. The method according to claim 1, wherein the waveform processing module is functioning when, at the step (e), the period of the sample waveform is equal to the predicted period.

13. The method according to claim 1, wherein the periodic wave has a period $T_o$ at sampling rate $R_o$ and the periodic wave is sampled by the waveform processing module at sampling rate $R_p$, and the predicted period $T_{predicted}$ of the sample waveform is defined by:

$$T_{predicted} = (R_p/R_o)T_o.$$

14. The method according to claim 1, wherein the periodic wave is a sinusoidal wave.

15. The method according to claim 1, wherein the waveform processing module is a circuitry for a LINE-IN channel.

16. The method according to claim 1, wherein the waveform processing module is a circuitry for a CD-IN channel.

17. The method according to claim 1, wherein the waveform processing module is a software program.

* * * * *